United States Patent [19]

Motohashi et al.

[11] Patent Number: 5,150,742
[45] Date of Patent: Sep. 29, 1992

[54] VAPOR RECOVERING DEVICE FOR VOLATILE LIQUID DISPENSING APPARATUS

[75] Inventors: Toshiaki Motohashi, Kanagawa; Yooichi Harada; Tsuyoshi Yanagihara, both of Kamakura, all of Japan

[73] Assignee: Tokyo Tatsuno Co., Ltd., Tokyo, Japan

[21] Appl. No.: 707,908

[22] Filed: May 30, 1991

[30] Foreign Application Priority Data

Jun. 8, 1990 [JP] Japan ................... 2-150495

[51] Int. Cl.⁵ .............. B65B 31/00; F04B 17/00
[52] U.S. Cl. ................................ 141/59; 141/44; 141/45; 417/405
[58] Field of Search ............ 141/59, 44–46; 417/405, 406, 407, 408

[56] References Cited

U.S. PATENT DOCUMENTS

| | | | |
|---|---|---|---|
| 3,016,928 | 1/1962 | Brandt | 141/59 |
| 3,850,208 | 11/1974 | Hamilton | 141/59 |
| 4,068,687 | 1/1978 | Long | 141/59 |
| 4,082,122 | 4/1978 | McGahey | 141/59 |
| 4,202,385 | 5/1980 | Voelz et al. | 141/59 |
| 4,295,802 | 10/1981 | Peschke | 141/59 |
| 4,448,256 | 5/1984 | Eberhardt et al. | 417/405 |
| 4,511,378 | 4/1985 | Greene | 55/208 |
| 4,649,970 | 3/1987 | Bower et al. | 141/59 |

FOREIGN PATENT DOCUMENTS 2230064 1/1972 Fed. Rep. of Germany .
2014544 8/1979 United Kingdom .

Primary Examiner—Henry J. Recla
Assistant Examiner—Keith Kupferschmid

[57] ABSTRACT

A device for recovering vapor in a vehicle fuel tank has a hydraulic motor arranged in the way of a liquid duct for feeding volatile liquid from a fuel reservoir tank to a gun nozzle mounted at the free end of the liquid duct, and a pneumatic pump arranged in the way of a vapor duct for feeding the vapor in the vehicle fuel tank through the gun nozzle to the fuel reservoir tank. The hydraulic motor and the pneumatic pump have a pair of meshing rotors, respectively. One pair of rotors are of substantially same configuration and size with those of the other pair of rotors. The rotors of the pneumatic pump are driven by the hydraulic motor rotors through multiplying gearings.

6 Claims, 4 Drawing Sheets

VAPOR RECOVERING DEVICE FOR VOLATILE LIQUID DISPENSING APPARATUS

BACKGROUND OF THE INVENTION AND RELATED ARTS

This invention relates to a device for recovering vapor generated in a closed system for dispensing volatile liquids, such as gasoline from a tank generally stalled under the ground to a vehicle fuel tank.

The amount of generated vapor is varied depending on a difference of a temperature of liquid, such as gasoline stored in the underground tank to be supplied, from an ambient temperature above the ground surface, and how far gasoline is agitated through the pump and nozzle, and splashed into the vehicle tank. When the vapor amount in the vehicle tank comes to be so much, the vapor is bursted out of a gap formed between a nozzle outer surface and a fuel filler pipe, which may result in dangerous problem. Even if the vapor amount does not reach the level referred to above, ordinarily released vapor causes air pollution and lead to useless loss of valuable energy.

Thus, vapor is usually recovered so as to be forcibly returned in the supply tank. For instance, U.S. Pat. No. 3,850,208 discloses a gun nozzle for supplying fuel to a vehicle such as automobile, which comprises a pair of independent passages to be connected respectively with a gasoline duct and a vapor duct of the gasoline dispensing apparatus, as well as two cavities eccentrically shaped and diametrically opposed across a central rotor, which has a plurality of radial slots and a corresponding number of vanes each yieldingly projecting from the concerned slot so as to seal the inner wall of the cavities, whereby when gasoline forcedly flows through the gasoline passage, the rotor is turned so as to feed vapor in the opposite direction to the vapor conduit.

Since the gun nozzle contains such liquid motor and vapor pump therein, the size and weight thereof is too large and heavy to readily handle. Furthermore, due to that liquid is apt to leak into the vapor pumping cavity in view of the constructional nature, the metered volume of gasoline often comes to be not correct. In view of such particular construction of the vapor pump, moreover, it is difficult to recover a large amount of vapor to be released for instance when the ambient temperature is considerably high.

In order to avoid and overcome the defects referred to above, U.S. Pat. No. 4,068,687 proposes a vapor recovery device comprising a hydraulic motor to be driven by the force of flowing liquid such as supplied gasoline as well as a pneumatic pump of a larger capacity than that of the motor. The pump for vapor is provided separately from the motor different from the above but the both are drivingly connected together by a common shaft so that the vapor pump is driven by the motor similar to the above. Owing to the larger capacity of the pump, a fairly large amount of vapor can be recovered, but when the amount of vapor generated is more than the rated capacity, it is impossible to recover such excessive vapor.

Furthermore, since the pump is stopped directly when fuel supply is stopped, vapor is to remain in the vapor recovery duct to flow out in the atmosphere.

SUMMARY OF THE INVENTION

It is an object, thus, of the invention, to provide a vapor recovering device capable of avoiding and overcoming the defects referred to above.

The object may be attained by a device for recovering vapor in volatile liquid dispensing apparatus comprising a duct for liquid having a gun nozzle mounted at the free end thereof to be supplied by means of a motor driven pump and a duct having a free end for collecting vapor at the free end of said gun nozzle, in which a hydraulic motor having a pair of rotors meshing with each other to be revolved by liquid flowing therethrough in a sealed casing is arranged in the way of said liquid duct between said gun nozzle and the motor driven pump and a pneumatic pump having a pair of rotors of just same configuration and size with those of the hydraulic motor rotors meshing with each other to be revolved in a sealed casing is arranged in the way of said vapor duct and contiguous to said hydraulic pump so as to be driven thereby through multiplying gearings, in which the pneumatic pump is preferably drivingly connected with the hydraulic motor via a freewheeling one way clutch. More preferably the pneumatic pump is connected with the hydraulic motor through a small diameter of conduit so that liquid may leak a little by little therethrough into the pneumatic pump for lubrication.

DESCRIPTION OF THE PREFERRED EMBODIMENT

Figure 8:
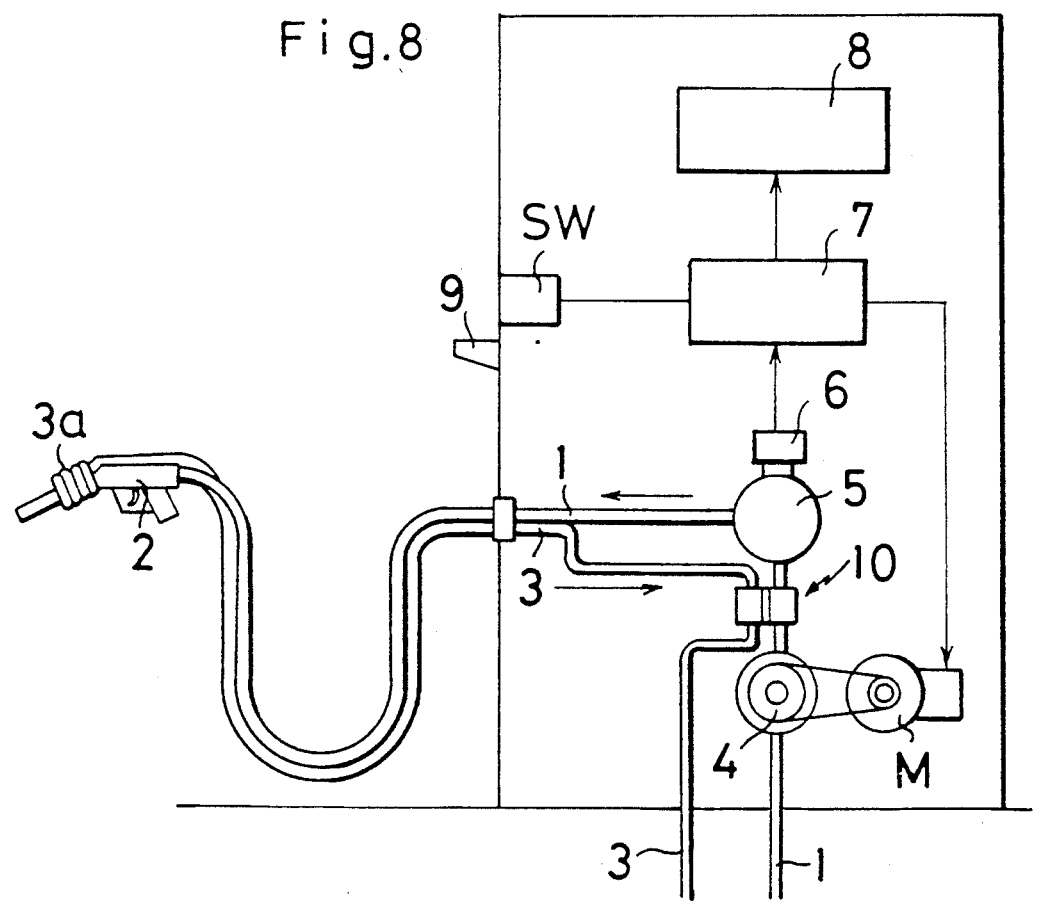
FIG. 8 is a schematic view of a fuel dispensing apparatus in the gasoline station, in which the vapor recovery device is used.

Firstly referring to FIG. 8 showing a concept of a typical fuel dispensing apparatus, a duct 1 for volatile fuel such as gasoline extends from a not shown tank under the ground to a gun nozzle 2, and a duct 3 for accumulated vapor to be recovered from the gun nozzle 2 to the underground tank not shown. The nozzle 2 has a vapor collector 3a at the free end thereof to be connected with the vapor duct 3. The fuel duct 1 passes through a pump 4 driven by a motor M, a device 10 of the invention, and a flow meter 5 to be connected with the nozzle 2. The flow meter 5 is provided with a pulse generator 6 so as to give pulse signals corresponding to the amount of fuel flowing therethrough so as to designate the supplied fuel volume on an indicator 8 via a control device 7. When the nozzle 2 is removed from a hook 9 and hung again thereon, a concerned switch SW is turned ON or OFF for actuating the control device 7.

The duct 3 for vapor extending from the gun nozzle 2 to the underground tank or any other vapor treating apparatus passes through neither of the meter 5 and the pump 4 but only through the device 10 according to the invention.

Figure 1:
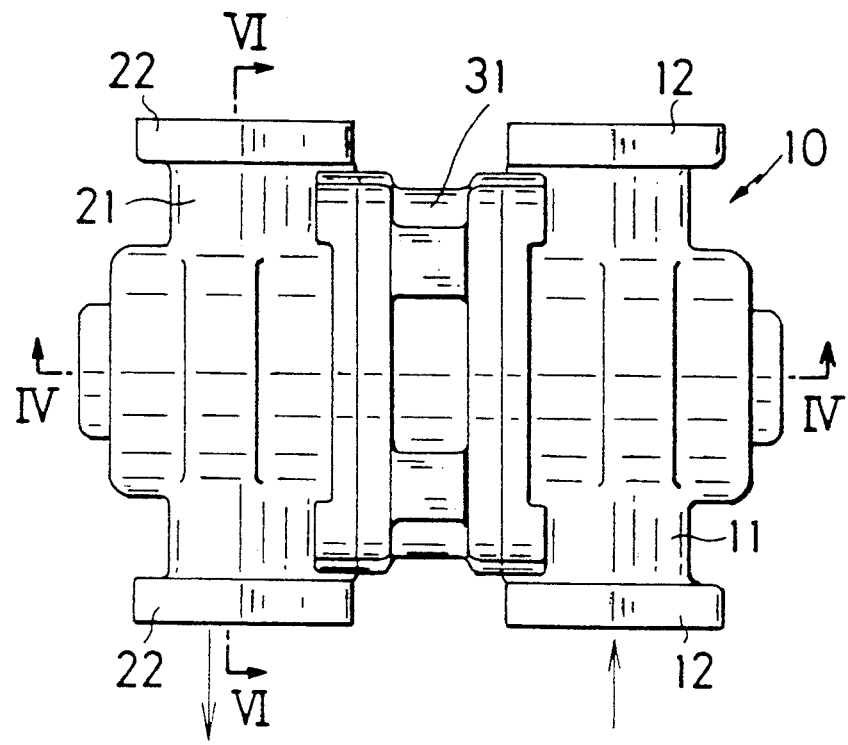
FIG. 1 is a front elevation of a vapor recovering device according to a preferred embodiment of the invention.
Figure 2:
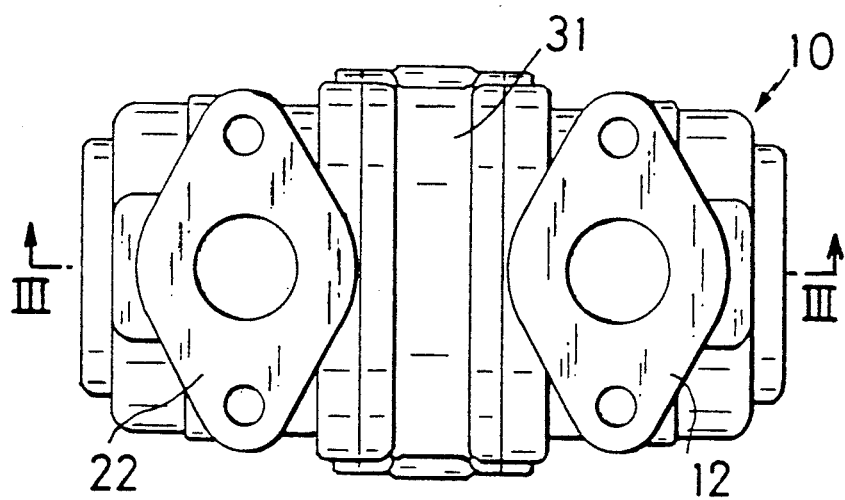
FIG. 2 is a plan view of the above.

Now in reference to FIGS. 1 and 2, the device of the invention generally represented by 10 comprises a casing 11 for a hydraulic motor, a casing 21 for a pneumatic pump and a casing 31 for connecting said two casings together and containing gearings therein.

The casing 11 has an upper and lower flanges 12, 12 for connecting the fuel duct 1 so that fuel may flow therethrough in a direction as shown by an arrow in FIG. 1 at the right. The casing 21, which is of the same configuration and size as casing 11 and arranged symmetrically relative to the middle casing 31, also has upper and lower flanges 22, 22 for connecting the vapor duct 3 so that collected vapor may flow therethrough in the opposite direction as shown by an arrow in FIG. 1 at the left.

Figure 3:
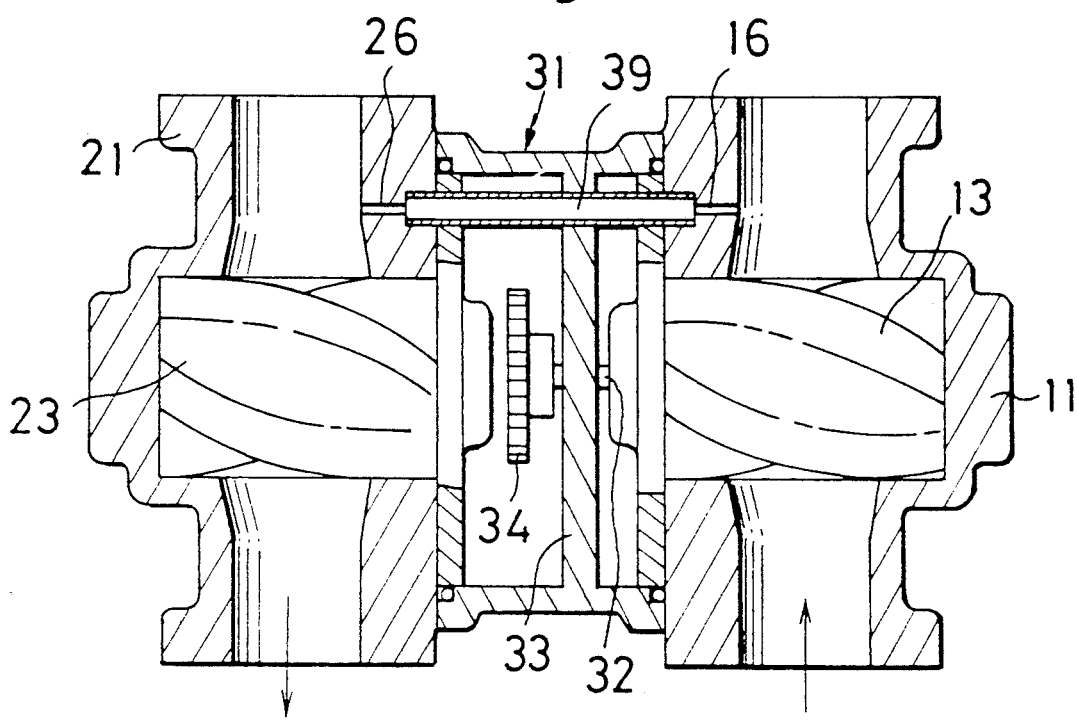
FIG. 3 is a sectional view taken along a line III—III in FIG. 2.
Figure 4:
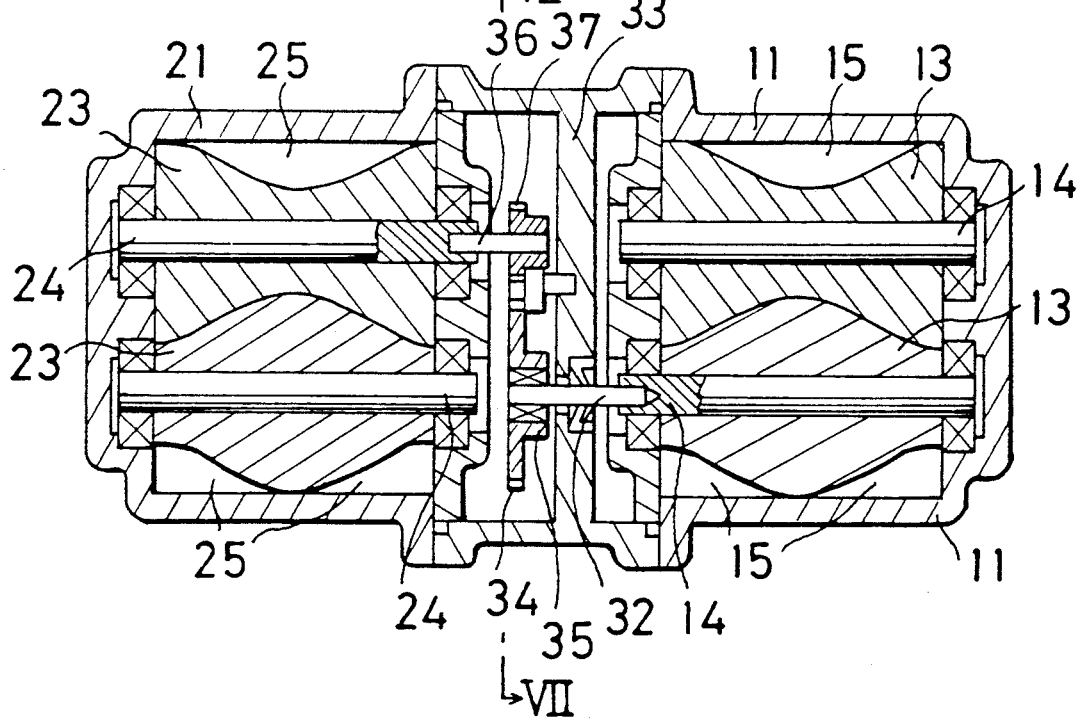
FIG. 4 is a sectional view taken along a line IV—IV in FIG. 1.
Figure 5:
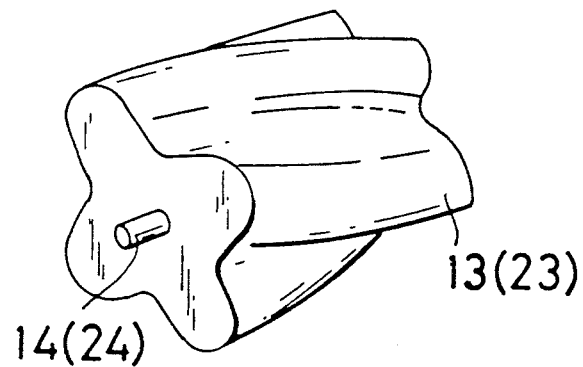
FIG. 5 is a perspective view of a rotor to be used for the device of the invention.

Now in reference to FIGS. 3 and 4, sections taken along the line III—III in FIG. 2 and the line IV—IV in FIG. 1, the hydraulic motor comprises a pair of four lobe torsion rotors 13, 13 respectively journalled 14, 14 in the casing 11 so as to mesh with each other and a cavity 15 formed around the torsion rotors 13, 13 in a chamber defined by the casing 11. When fuel is forced to flow by the motor driven pump 4 through the duct 1 in the direction just referred to above, the rotors 13, 13 are driven to revolve in the opposite directions.

The pneumatic pump similarly comprises a pair of four lobe torsion rotors 23, 23 respectively journalled 24, 24 in the casing 21 so as to mesh with each other and a cavity 25 formed around the rotors 23, 23 in a chamber defined by the casing 21.

The torsion rotors 13 and 23 are of the same configuration and size as thermoplastic resin so as to have 90° torsion angle.

Figure 7:
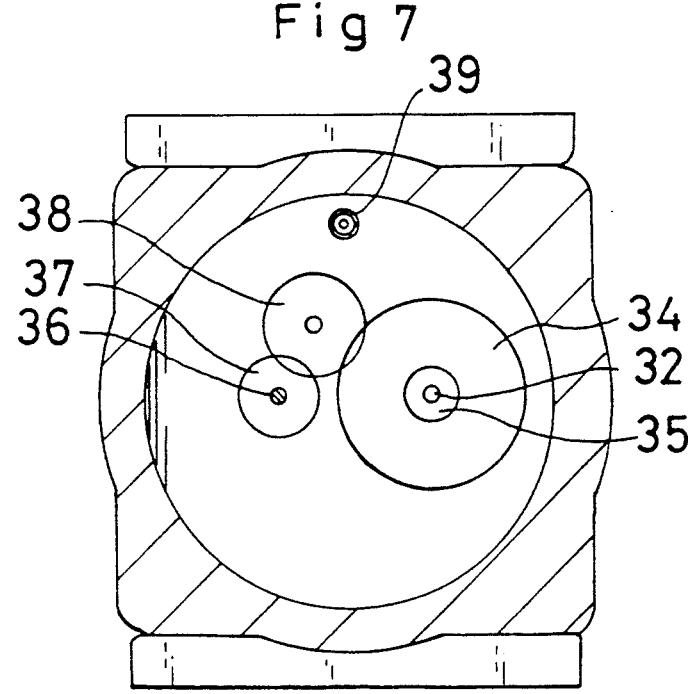
FIG. 7 is a section taken along a line VII—VII in FIG. 4.

One of the journals 14 is coaxially planted with a smaller diameter of shaft 32 which extends through a partition wall 33 of the intermediate casing 31. The shaft 32 is drivingly connected with a driving gear wheel 34 via a free wheeling one-way clutch 35. On the other hand, one of the journals 24 is similarly coaxially planted with a smaller diameter of shaft 36 which is mounted with a driven gear wheel 37 at the free end thereof. The driving and driven gear wheels 34 and 37 are meshed with an intermediate gear wheel 38 as best shown in FIG. 7, a section taken along the line VII—VII in FIG. 4.

Thus, when hydraulic motor rotors 13, 13 are driven to revolve by fuel flowing therethrough, the torsion rotors 23, 23 are driven to revolve via gearings having the one way clutch in the intermediate casing 31 so as to suck vapor from the vehicle fuel tank not shown and feed it to the underground tank also not shown, as the pneumatic pump.

The driven gear wheel 37 is so designed in relation to the driving gear wheel 34 that the pneumatic pump rotors 23, 23 may revolve at a speed of preferably 2-2.5 times relative to the revolution speed of the hydraulic motor rotors 13, 13, i.e. the amount of vapor to be recovered is more than that of supplied fuel preferably by 13-35%. Furthermore, owing to provision of the one way clutch 35 between the driving gear wheel 34 and the shaft 32, even if vapor is released, in an amount more than the suction capacity of the pneumatic pump, in the vehicle fuel tank, higher pressure of vapor may rotate the pump rotors 23, 23 at higher revolution speed so as to make it possible to recover a correspondingly larger amount of vapor, and even if fuel supply is stopped so that the hydraulic motor (13, 13) is stopped, the pneumatic pump (23, 23) may continue to revolve owing to pressure of remained vapor.

Figure 6:
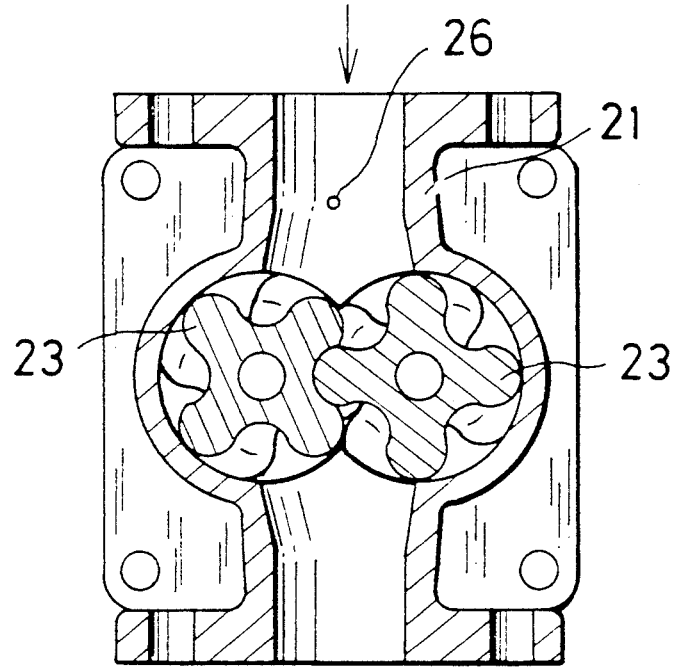
FIG. 6 is a section taken along a line VI—VI in FIG. 1.

As seen in FIG. 3 and FIG. 6, there are formed a transverse aperture or conduit 16 in an inner wall of the casing 11 at the down stream side and a corresponding transverse aperture or conduit 26 in an inner wall of the casing 21 at the upstream side, which are connected by a tube 39 so that fuel being supplied under pressure may leak a little by little e.g. 0.15/min therethrough into the casing 21 for lubricating the pump rotors 23, 23, whereby the pneumatic pump may be driven more efficiently with a less friction and for a longer life time.

What is claimed is:

1. A vapor recovery system comprising:
   a duct for liquid,
   a gun nozzle mounted at a free end of said duct,
   a motor driven pump supplying liquid to said duct,
   a vapor duct having a free end positioned for collecting vapor at a free end of said gun nozzle,
   a hydraulic motor located in said liquid duct between said gun nozzle and said motor driven pump,
   said hydraulic motor having a sealed casing containing a pair of rotors meshing with each other and adapted to be revolved by said liquid flowing through said hydraulic motor,
   a pneumatic pump having a sealed casing containing a pair of meshing rotors is located in said vapor duct,
   said rotors of said hydraulic motor having the same size and configuration as said rotors of said pneumatic pump, said hydraulic motor driving said pneumatic pump through multiplying gearing, and
   said casing of said hydraulic motor and said casing of said pneumatic pump having a connection therebetween, said connection including a small diameter aperture formed at a location upstream of said pump rotors so that liquid forcedly supplied through said hydraulic motor may leak little by little into the pneumatic pump.

2. A vapor recovery system as set forth in claim 1, in which said pneumatic pump is connected with the hydraulic motor via a freewheeling one-way clutch.

3. A vapor recovery system as set forth in claim 1, in which each of said rotors of said hydraulic motor and said pneumatic pump is a four lobe torsion rotor having a 90° torsion and is formed of an oil-proof thermoplastic resin.

4. A vapor recovery system as set forth in claim 1, in which said hydraulic motor is located in said liquid duct between said motor driven pump and a liquid flow meter which connects with said gun nozzle.

5. A vapor recovery system as set froth in claim 1, wherein said multiplying gearing comprises s driving gear wheel connected with an output shaft of said hydraulic motor via a freewheeling one-way clutch, said driving gear rotating a driven gear wheel connected with an input shaft of said pneumatic pump, so that said input shaft may revolve at a speed of 2-2.5 times the revolving speed of said output shaft.

6. A vapor recovery system comprising:
   a duct for liquid,
   a gun nozzle mounted at a free end of said duct,
   a motor driven pump supplying liquid to said duct, a vapor duct having a free end positioned for collecting vapor at a free end of said gun nozzle, a hydraulic motor located in said liquid duct between a flow meter which connects with said gun nozzle and said motor driven pump, said hydraulic motor having a sealed casing containing a pair of rotors meshing with each other and adapted to be revolved by said liquid flowing through said hydraulic motor, a pneumatic pump having a sealed casing containing a pair of meshing rotors is located in said vapor duct, said rotors of said hydraulic motor having the same size and configuration as said rotors of said pneumatic pump, said hydraulic motor driving said pneumatic pump through multiplying gearing. said gearing comprises a driving gear wheel connected with an output shaft of said hydraulic motor via a freewheeling one-way clutch, said driving gear rotating a driven gear wheel connected with an input shaft of said pneumatic pump, so that said input shaft may revolve at a speed of 2-2.5 times the revolving speed of said output shaft, said casing of said hydraulic motor and said casing of said pneumatic pump having a connection therebetween, said connection including a small diameter aperture formed at a location upstream of said pump rotors so that liquid forcedly supplied through said hydraulic motor may leak little by little into the pneumatic pump, and each of said rotors of said hydraulic motor and said pneumatic pump is a four one torsion rotor having a 90° torsion angle sand is formed of an oil-proof thermoplastic resin.

* * * * *